US010225633B2

(12) United States Patent
Frömel et al.

(10) Patent No.: US 10,225,633 B2
(45) Date of Patent: Mar. 5, 2019

(54) DUST SHIELDING APPARATUS

(75) Inventors: Andreas Frömel, Kirchseeon (DE); Jani Kuivalainen, Ulm (DE)

(73) Assignee: Nokia Technologies Oy, Espoo (FI)

( * ) Notice: Subject to any disclaimer, the term of this patent is extended or adjusted under 35 U.S.C. 154(b) by 857 days.

(21) Appl. No.: 14/128,826

(22) PCT Filed: Jul. 1, 2011

(86) PCT No.: PCT/IB2011/052921
§ 371 (c)(1),
(2), (4) Date: May 2, 2014

(87) PCT Pub. No.: WO2013/005073
PCT Pub. Date: Jan. 10, 2013

(65) Prior Publication Data
US 2014/0334649 A1    Nov. 13, 2014

(51) Int. Cl.
*H04R 1/02* (2006.01)
*H04M 1/18* (2006.01)
*H04R 1/12* (2006.01)
*H04M 1/03* (2006.01)

(52) U.S. Cl.
CPC ............. *H04R 1/023* (2013.01); *H04M 1/18* (2013.01); *H04R 1/12* (2013.01); *H04M 1/03* (2013.01)

(58) Field of Classification Search
CPC ...................................... H04R 1/023
See application file for complete search history.

(56) References Cited

U.S. PATENT DOCUMENTS

| | | | | |
|---|---|---|---|---|
| 2,134,047 A | * | 10/1938 | Kalsey | H04R 1/22 181/163 |
| 2,256,689 A | * | 9/1941 | Quam | H04R 9/02 381/189 |
| 2,673,251 A | * | 3/1954 | Duncan | H04R 9/048 181/158 |
| 4,430,520 A | * | 2/1984 | Tibbetts | H04R 11/00 174/377 |
| 4,554,703 A | * | 11/1985 | Matuki | B03C 1/284 15/424 |
| 4,887,690 A | * | 12/1989 | Patel | H04R 1/023 181/150 |
| 5,690,886 A | * | 11/1997 | Kurihara | B29C 45/0046 264/328.1 |
| 6,589,331 B2 | * | 7/2003 | Ostertag | A61Q 1/02 106/403 |

(Continued)

FOREIGN PATENT DOCUMENTS

| | | |
|---|---|---|
| EP | 1198109 | 4/2002 |
| EP | 1976328 | 10/2008 |
| WO | 2011076289 | 6/2011 |

OTHER PUBLICATIONS

International Search Report received for corresponding Patent Cooperation Treaty Application No. PCT/IB2011/052921, dated Mar. 16, 2012, 4 pages.

*Primary Examiner* — Matthew A Eason
*Assistant Examiner* — Taunya McCarty
(74) *Attorney, Agent, or Firm* — Harrington & Smith

(57) ABSTRACT

An apparatus comprising at least one sound aperture configured to be acoustically coupled to an air displacement component, wherein the at least one sound aperture configured to produce a magnetically shielded region to form a trap for particles.

19 Claims, 6 Drawing Sheets

(56) References Cited

U.S. PATENT DOCUMENTS

| | | | | |
|---|---|---|---|---|
| 2004/0262210 | A1* | 12/2004 | Westervelt | B01L 3/502761 210/222 |
| 2006/0198547 | A1* | 9/2006 | Hampton | H04R 1/023 381/395 |
| 2009/0245565 | A1* | 10/2009 | Mittleman | H04M 1/035 381/365 |

* cited by examiner

DUST SHIELDING APPARATUS

RELATED APPLICATION

This application was originally filed as PCT Application No. PCT/IB2011/052921 filed Jul. 1, 2011.

FIELD OF THE APPLICATION

The present application relates to a method and apparatus for dust protection and magnetic shielding. In some embodiments the method and apparatus relate to a dust protection and magnetic shielding for transducers.

BACKGROUND OF THE APPLICATION

Some portable electronic devices comprise transducers such as loudspeakers and/or earpieces which are required to be small in size. Transducers are important components in electronic devices such as mobile phones for the purposes of playing back music or having a telephone conversation. The quality and loudness of a transducer in an electronic device are important especially if a user listens to sounds generated by an electronic device at a distance from the electronic device.

Furthermore in portable devices dust and water protection is important specifically with regards to the transducers. However dust and other small particles (and water) can often reach the transducer components and cause component damage. In particular the dynamic moving coil components in transducers radiate in each direction as the diaphragm moves forwards and backwards and as the construction of the transducer typically has open outlets on either side of the transducer which are free to air and the permanent magnet of a moving coil transducer can attract magnetic particles which migrate through the portable device and reach the coil and diaphragm. These particles can damage the sensitive components and/or reduce the performance of these components when the apparatus is in operation.

For example after some time metallic particles can reach the transducer due to the force between magnetic dust and the permanent magnet inside the electrodynamic loudspeaker. These metallic particles can interfere with the diaphragm and cause distortion. The metallic particles can further damage the diaphragm. These types of failure typically require repair and are costly to the manufacturer of the device if the failure occurs within the warranty period. Furthermore these features can cause brand damage if the failure occurs soon after the warranty period as the user considers the device to have failed prematurely and of poor quality.

Often a protective mesh or other porous material, where appropriate, is implemented to assist audio reproduction quality but maintain good reliability of the transducer by protecting the transducer from particles entering through the sound outlets in the device. For example a dust net can be placed in front of the loudspeaker. However the more effective a dust net is, in other words the denser the material used, the more attenuation to the sound generated by the speaker. Therefore other solutions are considered in order to reduce the effect of such attenuation such as increasing gain levels either in electronic circuitries and/or software. These solutions are known to be more complex, inefficient and can muffle the speaker output.

It has also been proposed that a permanent magnet can be used to collect the magnetic dust. However the employment of further permanent magnets not only increases the cost and that the number of parts required for the device but furthermore can increase stray magnetic fields which are detrimental to the use of the device as they can accidentally erase other magnetic items such as the magnetic strip on a credit card, debit card, a train ticket, or other device using a magnetic strip.

SUMMARY OF SOME EMBODIMENTS

There is provided according to a first aspect of the application an apparatus comprising: at least one sound aperture configured to be acoustically coupled to an air displacement component, wherein the at least one sound aperture configured to produce a magnetically shielded region to form a trap for particles.

The apparatus may further comprise a transducer comprising the air displacement component.

The at least one sound aperture may be located between the transducer and an apparatus casing.

The magnetically shielded region may be formed to trap particles on the exterior surface of the apparatus.

The apparatus may further comprise a dust net located proximate to the at least one sound aperture configured to permit sound to pass through the dust net.

The apparatus may further comprise a cover comprising the at least one sound aperture.

A region neighbouring the at least one sound aperture may comprise at least one of: a slit; a pocket; an aperture; a conduit; and a hole.

The region neighbouring the at least one sound region may be acoustically de-coupled with respect to the air displacement component.

The apparatus may further comprise an apparatus casing and wherein the cover may be physically coupled to the apparatus casing and configured to permit sound to pass through the cover.

The cover may be substantially at least one of: a mu-metal; a material with high magnetic permeability; stainless steel grade SUS 310; and stainless steel grade SUS 430.

The at least one sound aperture may be located inside the apparatus.

The magnetically shielded region may comprise at least one of: a mu-metal; a material with high magnetic permeability; stainless steel grade SUS 310; and stainless steel grade SUS 430.

The at least one surface of the at least one sound aperture may be coated by a material whose relative permeability is at least higher or lower than the neighbouring region.

The relative permeability of the at least one sound aperture may be lower than a region neighbouring the at least one sound aperture.

The apparatus may be configured as an acoustic radiator and radiates the acoustic signal from the air displacement component towards an exterior wherein said air displacement component converts electrical signal to an acoustic signal and is at least one of: a moving coil speaker; an electrostatic (or electret) speaker; a piezo electric speaker; a ceramic speaker; and any other suitably designed speaker.

The apparatus may be configured as an acoustic collector wherein the acoustic signal is collected towards the air displacement component wherein said air displacement component converts acoustic signal to an electrical signal and is at least one of: an omni-directional microphone; a directional microphone; and any other suitably designed microphone module.

The apparatus may further comprise: a first layer; and a second layer wherein the at least one sound aperture is formed by the interaction of the first layer and the second layer and the at least one sound aperture is configured to permit sound to pass between the first layer and the second layer.

The first layer may comprise at least one window which overlies and is offset from the second layer, wherein the at least one sound aperture may be formed by the first layer window and the offset between the first and second layers.

The second layer may be protrusions formed in the first layer.

The protrusions may comprise at least one of: linear profile second layer; and curved profile second layer.

The at least one sound aperture acoustically coupled to the air displacement component may comprise at least two sound apertures, and wherein the first of the at least two sound apertures may be configured to produce a magnetic field in a first direction and a second of the at least two sound apertures may be configured to produce a magnetic field in a second direction.

The first and the second direction may be in a first plane substantially perpendicular to the direction defined by the transducer and the at least two sound apertures.

The at least one sound aperture may comprise at least two sound apertures and wherein the first of the at least two sound apertures may be acoustically coupled to the air displacement component and a second of the at least two sound apertures may be configured to produce a magnetic field.

According to a second aspect of the application there is provided an apparatus comprising: sound aperture means for acoustically coupling an air displacement component, wherein the sound aperture means comprise magnetic means to produce a magnetically shielded region to form a trap for particles.

The apparatus may further comprise transducer means comprising the air displacement component.

The sound aperture means may be located between the transducer and an apparatus casing.

The magnetic means magnetically shielded region may be formed to trap particles on the exterior surface of the apparatus.

The apparatus may further comprise dust net means located proximate to the sound aperture means configured to permit sound to pass through the dust net means.

The apparatus may further comprise cover means comprising the at least one sound aperture.

A region neighbouring the sound aperture means may comprise at least one of: a slit; a pocket; a aperture; a conduit; and a hole.

The region neighbouring the sound aperture means may be acoustically de-coupled with respect to the air displacement component.

The apparatus may further comprise apparatus casing means and wherein the cover means may be physically coupled to the casing means for permitting sound to pass through the cover means.

The cover means may be substantially at least one of: a mu-metal; a material with high magnetic permeability; stainless steel grade SUS 310; and stainless steel grade SUS 430.

The sound aperture means may be located inside the apparatus.

The magnetic means may comprise at least one of: a mu-metal; a material with high magnetic permeability; stainless steel grade SUS 310; and stainless steel grade SUS 430.

At least one surface of the sound aperture means may be coated by a material whose relative permeability is at least higher or lower than the neighbouring region.

The relative permeability of the sound aperture means may be lower than a region neighbouring the sound aperture means.

The apparatus may be configured as an acoustic radiator and radiates the acoustic signal from the air displacement component towards an exterior wherein said air displacement component converts electrical signal to an acoustic signal and may be at least one of: a moving coil speaker; an electrostatic (or electret) speaker; a piezo electric speaker; a ceramic speaker; and any other suitably designed speaker.

The apparatus may be configured as an acoustic collector wherein the acoustic signal may be collected towards the air displacement component wherein said air displacement component converts acoustic signal to an electrical signal and may be at least one of: an omni-directional microphone; a directional microphone; and any other suitably designed microphone module.

The apparatus may further comprise: a first layer; and a second layer wherein the sound aperture means is formed by the interaction of the first layer and the second layer and the sound aperture means permits sound to pass between the first layer and the second layer.

The first layer may comprise at least one window which overlies and is offset from the second layer, wherein the sound aperture means may be formed by the first layer window and the offset between the first and second layers.

The second layer may be protrusions formed in the first layer.

The protrusions may comprise at least one of: linear profile second layer; and curved profile second layer.

The sound aperture means may comprise at least two sound apertures, and wherein the first of the at least two sound apertures may be configured to produce a magnetic field in a first direction and a second of the at least two sound apertures may be configured to produce a magnetic field in a second direction.

The first and the second direction may be in a first plane substantially perpendicular to the direction defined by the transducer and the at least two sound apertures.

The sound aperture means may comprise at least two sound apertures and wherein the first of the at least two sound apertures may be acoustically coupled to the air displacement component and a second of the at least two sound apertures may be configured to produce a magnetic field.

According to a third aspect of the application there is provided a method comprising: acoustically coupling an air displacement within an apparatus to at least one sound aperture, and magnetically trapping particles within the at least one sound aperture.

The method may further comprise generating the air displacement by a transducer within the apparatus.

The method may further comprise locating the sound aperture between the transducer and an apparatus casing.

Magnetically trapping particles may comprise generating a magnetically shielded region formed to trap particles on the exterior surface of the apparatus.

The method may further comprise locating a dust net proximate to the at least one sound aperture.

The method may further comprise locating the at least one sound aperture within a cover.

A region neighbouring the at least one sound aperture may comprise at least one of: a slit; a pocket; a aperture; a conduit; and a hole.

The method may further comprise acoustically decoupling the region neighbouring the at least one sound aperture with respect to the air displacement component.

The method may further comprise: encasing the apparatus in an apparatus case; and physically coupling the cover to the apparatus case permitting sound to pass through the cover.

The at least one sound aperture may be located inside the apparatus.

The method may further comprise coating at least one surface of the sound aperture by a material whose relative permeability is at least higher or lower than the neighbouring region.

The relative permeability of the at least one sound aperture may be lower than a region neighbouring the at least one sound aperture.

The method may further comprise: providing a first layer; and providing a second layer wherein the at least one sound aperture may be formed by the interaction of the first layer and the second layer and the at least one sound aperture permits sound to pass between the first layer and the second layer.

The method may comprise providing at least one window in the first layer which overlies and may be offset from the second layer, wherein the at least one sound aperture may be formed by the first layer window and the offset between the first and second layers.

The method may further comprise forming the second layer as protrusions from the first layer.

The protrusions may comprise at least one of: linear profile second layer; and curved profile second layer.

Forming the second layer as protrusions from the first layer may comprise at least one of: punching the first layer with a punch; stamping the first layer with a stamp; scoring the first layer and cutting the first layer.

The second layer may be mechanically coupled to the first layer.

The at least one sound aperture may comprise at least two sound apertures, and wherein the first of the at least two sound apertures may produce a magnetic field in a first direction and a second of the at least two sound apertures may produce a magnetic field in a second direction.

The first and the second direction may be in a first plane substantially perpendicular to the direction defined by the transducer and the at least two sound apertures.

The at least one sound aperture may comprise at least two sound apertures and wherein the first of the at least two sound apertures may be acoustically coupled to the air displacement component and a second of the at least two sound apertures may be configured to produce a magnetic field.

BRIEF DESCRIPTION OF DRAWINGS

For a better understanding of the present application and as to how the same may be carried into effect, reference will now be made by way of example to the accompanying drawings in which.

SOME EMBODIMENTS OF THE APPLICATION

The following describes apparatus and methods for magnetically shielding a transducer.

Figure 1:
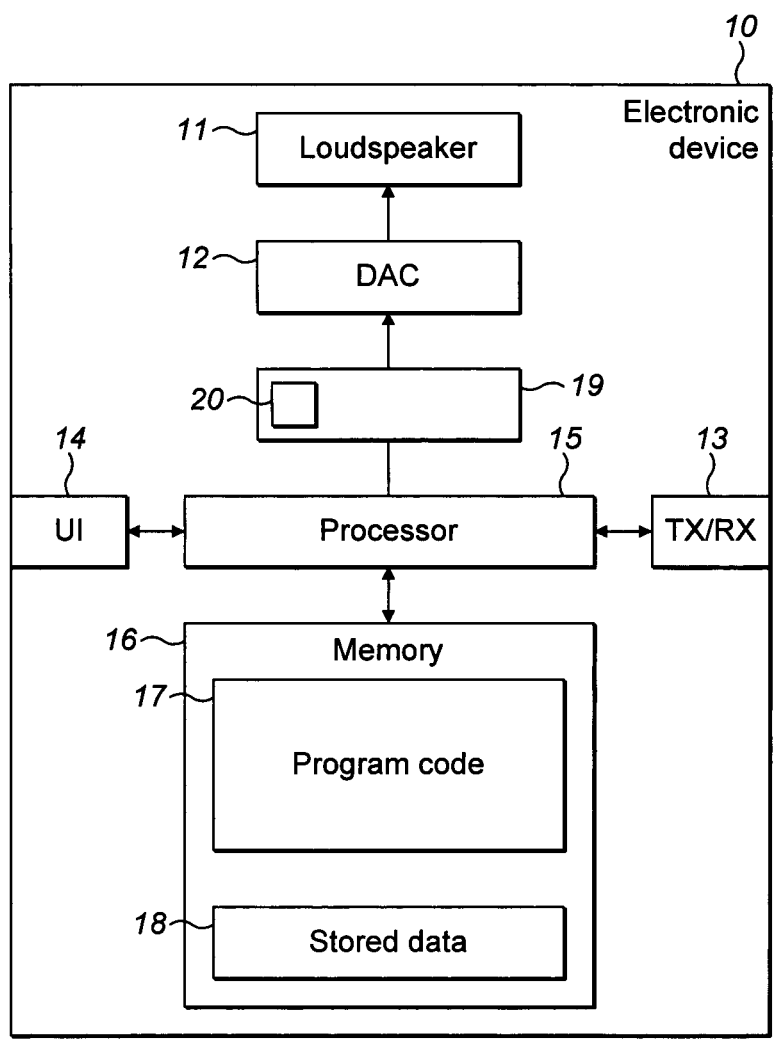
FIG. 1 illustrates a schematic block diagram of an apparatus according to some embodiments.

FIG. 1 discloses a schematic representation of an electronic device or apparatus 10 comprising a transducer or speaker 11. The transducer 11 may be an integrated speaker such as an integrated hands free speaker, (IHF), loudspeaker or an earpiece. In some other embodiments the transducer can be integrated with the cover or another apparatus/phone part to form a speaker box.

The transducer 11 in some embodiments can be any suitable speaker type. For example in some embodiments the transducer can comprise a permanent magnet moving coil transducer, moving magnet, or piezoelectric transducer. Additionally or alternatively the transducer 11 comprises a multifunction device (MFD) component having any of the following; combined earpiece, integrated handsfree speaker, vibration generation means or a combination thereof.

The apparatus 10 in some embodiments can be a mobile phone, portable audio device, or other means for playing sound. The apparatus 10 has a sound outlet for permitting sound waves to pass from the transducer 11 to the exterior environment.

The apparatus 10 is in some embodiments a mobile terminal, mobile phone or user equipment for operation in a wireless communication system.

In other embodiments, the apparatus 10 is any suitable electronic device configured to generate sound, such as for example a digital camera, a portable audio player (mp3 player or similar), a portable video player (mp4 player or similar) and a portable computer, for example a laptop PC. In some other embodiments the apparatus 10 can be any suitable audio or audio subsystem component or any suitable audio capture/audio rendering device In some embodiments, the apparatus 10 comprises a sound generating module 19 which is linked to a processor 15. The processor 15 can be configured to execute various program codes. The implemented program codes may comprise a code for controlling the transducer 11 to generate sound waves. In some embodiments the sound generating module 19 comprises a transducer protection module 20 for modifying the audio signals for the transducer 11.

The implemented program codes in some embodiments 17 can be stored for example in the memory 16 for retrieval by the processor 15 whenever needed. The memory 16 could further provide a section 18 for storing data, for example data that has been processed in accordance with the embodiments. The code can, in some embodiments, be implemented at least partially in hardware or firmware.

In some embodiments the processor 15 is linked via a digital-to-analogue converter (DAC) 12 to the transducer 11. The digital to analogue converter (DAC) 12 can be any suitable converter.

In some embodiments the DAC 12 sends an electronic audio signal output to the transducer 11 and on receiving the audio signal from the DAC 12, the transducer 11 generates acoustic waves. In other embodiments, the apparatus 10 receives control signals for controlling the transducer 11 from another electronic device.

The processor 15 can be further linked to a transceiver (TX/RX) 13, to a user interface (UI) 14 and to a display (not shown). The user interface 14 can enable a user to input commands or data to the apparatus 10. Any suitable input technology can be employed by the apparatus 10. It would be understood for example the apparatus in some embodiments could employ at least one of a keypad, keyboard, mouse, trackball, touch screen, joystick and wireless controller to provide inputs to the apparatus 10.

Figure 2:
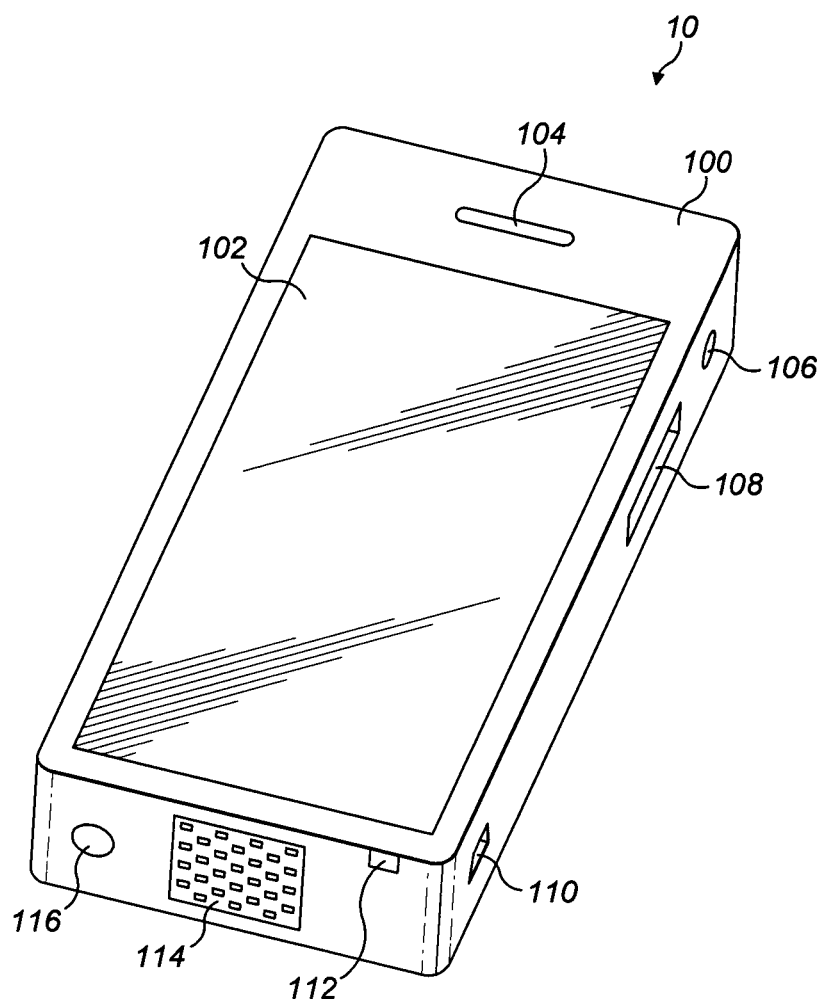
FIG. 2 illustrates a schematic diagram of a magnetic shield configuration according to some embodiments of the application.

FIG. 2 is a plan view of an apparatus suitable for operating as a mobile phone 10 according to some embodiments. In other embodiments the mobile phone 10 may be an electronic device such as a music player or a wireless communication system.

The mobile phone 10 may in some embodiments comprise an outer cover 100 which houses some internal components. The outer cover may comprise a display region 102 through which a display panel is visible to a user. The outer cover in some embodiments comprises a speaker aperture 104. In these embodiments the speaker aperture 104 may further include a separate bezel for the speaker aperture 104 or in some other embodiments may be formed as part of the outer cover 100 or the display region 102. When the speaker aperture 104 is placed adjacent to a user's ear, sound generated by an earpiece module (not shown) is audible to the user. The mobile phone 10 may further comprise a volume control button 108 with which the user can control the volume of an output of the speaker modules. The mobile phone 10 comprises at least one sound outlet 114 which may be used to radiate sound waves generated by a speaker module (not shown). The speaker module may be used for handsfree operations such as music playback, ringtones, handsfree speech and/or video call. The sound outlet 114, sound aperture or sound aperture means, couples the acoustic output of the speaker module to exterior of the mobile phone 10. In some embodiments, the sound outlet 114 may comprise a suitable mesh structure or grill which may take various forms, shapes or materials and which may be designed in relation to the frequency response of the speaker module.

The sound outlet 114 may be structured as an array of individual small outlets or may be a single cross section area. The sound outlet 114 may be rectangular or cylindrical or may be any other suitable shape. At least one microphone outlet 112 for a microphone module (not shown) may be suitably positioned in mobile phone 10 to capture the acoustic waves by at least one microphone and output the acoustic waves as electrical signals for further processing and/or storing for later playback.

The mobile phone 10 may provide interfaces enabling the user to interface external devices or equipment to the mobile phone 10. For example an audio connector outlet 106 may be suitably positioned in the mobile phone 10. In some embodiments, the audio connector outlet may be substantially hidden behind a suitably arranged door or lid. The audio connector outlet 106 may be suitable for connection with an audio connector (not shown) or may be suitable for connection with an audio or audio/visual (A/V) connector. The audio connector provides releasable connection with audio or A/V plugs (not shown). These plugs provide an end-termination for cabling and are used to connect a peripheral device to the mobile phone 10. In this way, the mobile phone 10 is able to output audio or A/V and receive audio or A/V input. Such audio or A/V plugs are often called round standard connectors and may be in different formats which may comprise at least two contacts. The external device such as a headset may itself comprise a microphone or suitable connection for a microphone or further connection suitable for end terminating further cabling. The audio connector and/or associated plug may be a standardized 2.5 mm or 3.5 mm audio connector and plug. It is accordingly understood the audio connector outlet 106 may be formed comprising a suitably arranged cross section area.

The mobile phone 10 may further comprise in some embodiments a universal serial bus (USB) interface outlet 110. The USB interface outlet 110 is suitably arranged for a USB connector (not shown).

The mobile phone 10 may further require a charging operation and therefore comprise a charging connector 116. The charging connector 116 may be of various sizes, shapes and combinations or in some embodiments can be visually or substantially hidden.

Figure 3A:
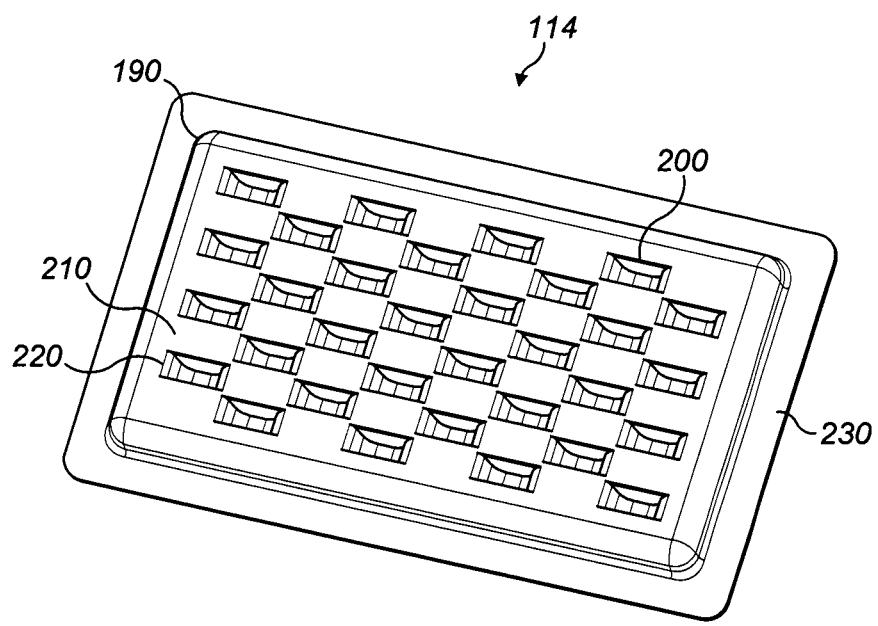
FIG. 3a illustrates a schematic diagram of the sound outlet 114 shown in FIG. 2 according to some embodiments of the application.
Figure 3B:
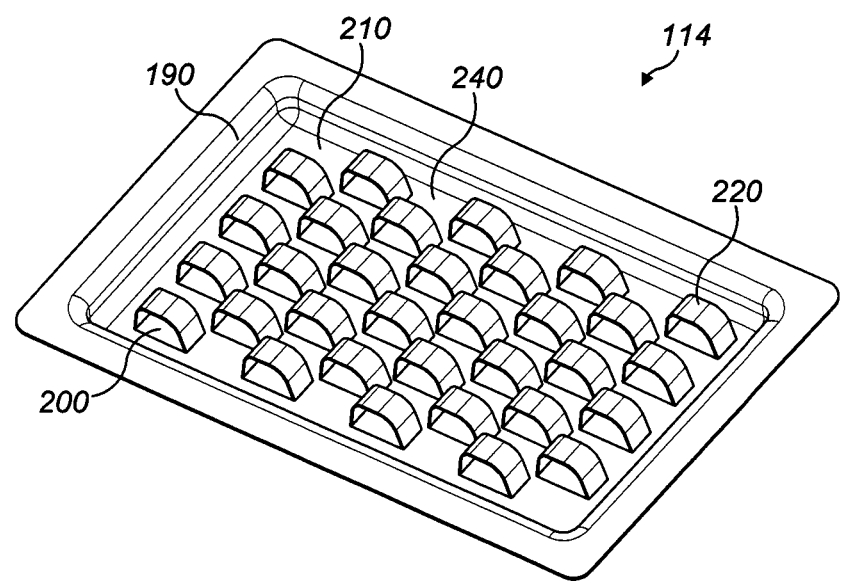
FIG. 3b illustrates a further schematic diagram of the sound outlet 114 shown in FIG. 2 according to some embodiments of the application.

FIG. 3a illustrates a schematic diagram of a front view of the sound outlet 114 shown in FIG. 2 according to some embodiments of the application. Furthermore FIG. 3b illustrates a schematic diagram of a rear view of the sound outlet 114 shown in FIG. 2. The configuration shows a particular example of the general concept of the sound outlet 114 in the form of a cover 190 made of μ-metal wherein the physical construction provides a magnetically shielded region for each sound aperture with a magnetic permeability to form a trap for dust particles. The cover 190 made of μ-metal comprises at least one sound aperture 200 which is shaped to contain or collect metal dust by means of concentrating the magnetic field to certain regions on the cover 190. In other words the sound aperture means comprise magnetic means to produce a magnetically shielded region to form a trap for particles. These concentrated magnetic field regions can be referred to as being the "dust trap" region. It is understood that the dust is trapped before entering the at least one sound aperture 200 on the exterior surface of the cover 190.

In an alternative embodiment, the sound outlet 114 can comprise a single sound aperture suitably shaped and dimensioned. The cover 190 comprises a first layer 210 and a second layer 220 wherein the at least one sound aperture 200 is formed between the first layer 210 and the second layer 220.

Although the example shown in FIGS. 3a and 3b show the second layer 220 as a curved element, it would be understood that in some embodiments the second layer is shaped in other suitable forms such as a semi circular, rectangular, triangular or any other suitable shape.

The examples shown herein discuss the application of embodiments where the sound outlet is between the environment exterior to the mobile phone and the transducer is a speaker (in other words converting electrical or electronic signals into acoustic waves), however it would be understood that in some embodiments the transducer is a microphone (converting acoustic waves into electrical or electronic signals).

Furthermore although FIG. 2 shows the cover 190, or cover means, located on the lower side of the mobile phone 10, it would be understood the cover 190 can be located over any suitable acoustic window/sound outlet at any surface of the mobile phone 10 and do not limit embodiments of the application to any particular alignment or directional orientation.

The arrangement of the cover 190 in FIG. 3a is shown as a single component, such as a sheet of mu-metal which is stamped with a suitable stamp pattern to form the locating frame configured to located the sound outlet 114 to the casing 100 of the apparatus, the central cover (first) layer 210, and the stamped protrusions (forming the second layer 220), where the gaps formed by the central cover and protrusions form the at least one sound aperture 200. In some embodiments the first layer 210 is punched and cut in manufacturing in order to form the second layer 220.

Figure 5A:
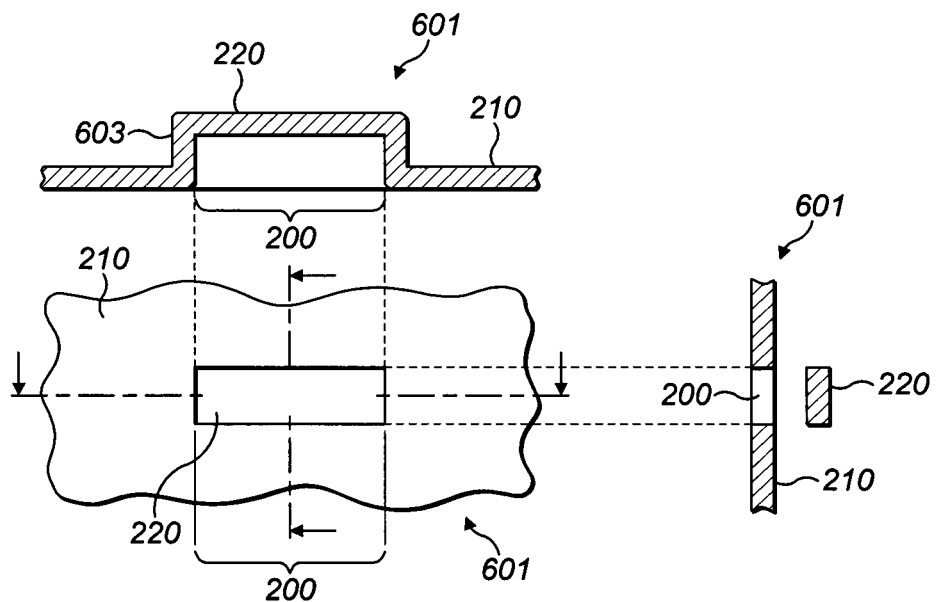
FIGS. 5a to 5c illustrate further schematic diagrams of the structure of individual parts of the sound outlets according to some embodiments of the application.

With respect to FIG. 5a a sectioned view of a cover portion 601, showing the at least one sound aperture. The cover portion 601 is shown with a cross sectional view of edge on views from two directions of the cover portion also shown. The cover portion 601 shows the first layer 210, from which is punched the second layer 220 and is coupled to the first layer by the coupling parts 603.

Figure 5B:
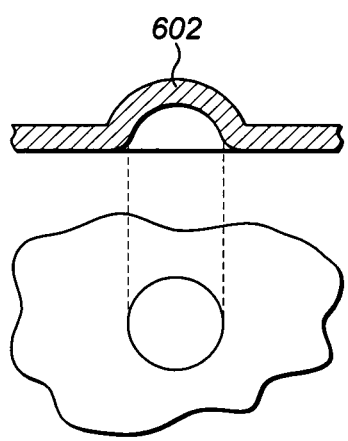

Furthermore although the protrusion is shown with a flat profile, forming a rectangular sound aperture in the first layer 210 any suitable profile protrusion can be formed, for example as shown in FIG. 5b, the cover portion shows a cross-sectional profile of stamping forming a curved or dimple profile forming substantially circular sound apertures.

Figure 5C:
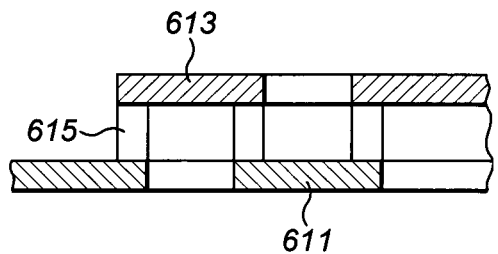

However it would be understood that the cover 190 can also be manufactured and/or comprise separate layers which are suitably joined and manufactured. Therefore in some embodiments, the first and second layers are formed separately, for example the first layer is cut to form each hole, the second layer 220 is manufactured as a grid or mesh and ultrasonically welded or mechanically coupled to the first layer 210. For example as shown in FIG. 5c the separate first layer 611 and second layer 613 are coupled by a coupling structure 615.

In some further embodiments, an adhesive material or laser glue is used to physically couple the separate second layer 220 to the first layer 210.

Although FIG. 3a is shown such that the second layer 220 is extended away from the first layer 210, in other words the first layer 210 is further peripheral or exterior to the second layer, it would be understood that the second layer 220 or protrusions can be located further peripherally or exterior to the first layer formed a more textured surface effect. Furthermore it would be understood that the terms "above", "below" and "away" are simply reference directions and do not limit embodiments of the application to any particular arrangement.

In some embodiments the mobile phone 10 can comprise a removable cover wherein the cover 190 is suitably located or the structure of the sound outlet 114 is arranged inside the removable cover. The removable cover is considered as a case of the mobile phone 10 which can be used to mechanically protect the electronic components within the mobile phone 10 and furthermore provide dust protection and magnetic shielding for transducers. The sound outlet 114 can in some embodiments comprise a series of sound outlet holes, over which the cover 190 is located and provides dust and mechanical protection. The sound outlet holes can be conduits or acoustic windows and permit acoustic or sound waves to pass between the environment or exterior of the mobile phone 10 and the interior of the mobile phone 10.

In FIG. 3a the cover 190 is shown comprising a matrix, grid or array configuration of at least one row and an at least one column of sound apertures 200 wherein the total cross section area of all of the sound apertures 200 is suitable for the acoustic response of the speaker module.

As described herein the at least one sound aperture 200 is provided between the first layer 210 and the second layer 220. The at least one sound aperture 200 furthermore is shown with a curved shape protrusion however it would be understood that in some embodiments any suitable number, shape and arrangement of sound apertures can be used to allow sound waves to pass through the cover 190.

Therefore in some embodiments the at least one sound aperture 200 of the cover 190 can be a single aperture, or slit. In some embodiments the sound apertures 200 can furthermore be substantially or partially covered by an acoustic transparent or opaque cover, such as a wire mesh or dust net, to attempt to further reduce foreign bodies entering the device.

The cover 190 in some embodiments can be an integral part of the complete casing, or casing means, of the mobile phone 10 or any other apparatus in other embodiments, or in some other embodiments form or co-operate with a section of apparatus cover or casing. Furthermore the inside of the cover 190 can be formed in such a manner to enable other parts or elements of the mobile phone 10 shown in FIG. 3a a third layer 230 to cooperate and locate these other elements or components relative to the sound outlet 114 or other elements within the mobile phone 10.

For example as shown in FIG. 3b a further acoustic cavity 240 is formed inside the cover 190 around sound apertures, and which is acoustically coupled with the speaker module (not shown). In some embodiments, the further acoustic cavity 240 provides an acoustic characteristic towards the frequency response of the speaker module. Furthermore, the further acoustic cavity 240 is used for tuning the acoustic response of the speaker module.

The sound outlet 114, and each sound aperture 200, in some embodiments comprises means for generating a dust trap or particle trapping means. In some embodiments the dust trap means as shown in the example in FIG. 3a is formed where the cover 190 is substantially or partially made of μ-metal causing a magnetic field around each of the at least one sound aperture 200 generated by each narrow gap and thus configured to attract and trap the dust before the dust can enter and reach the transducer.

In other words the at least one sound aperture 200 can therefore be suitably shaped between the first layer 210 and the second layer 220 of μ-metal such that the first and second layers are separated by the at least one sound aperture. The air gap formed in the cover 190 by suitably shaping sound apertures for the speaker module furthermore traps dust before entering sound apertures or provide magnetic trap which is provided without needing additional or separate μ-metal (or other electromagnetically similar) plates. The neighbouring region between the first layer 210 and the second layer 220 of μ-metal forms a magnetic field strongest where the gap is narrow. Although the metallic dust trap is shown being formed by the air gap between the first layer 210 and the second layer 220, it would be understood that a further dust net can be provided to stop other particles passing the sound aperture 200.

It is understood that the magnetic flux is generated across the shortest gap from one magnetic edge to another. In some embodiments, where the cover comprises an array and/or matrix structure of sound apertures 200, such as shown in FIG. 3a, the orientation and/or shape of the air gaps can be configured in such a way that the magnetic flux direction of one row or column is substantially perpendicular to the direction of the magnetic flux of the next or neighbouring row or column. Furthermore in some other embodiments the magnetic flux is configured to be in any orientation but in line with the first and second layer. In other words where the cover is said to be aligned in the x-y plane the flux is permitted by designing the shortest gap in the suitable orientation to have any alignment in the x-y plane and be perpendicular to the z-axis. It would be understood that in some embodiments the orientation and arrangement of the air gaps could furthermore be configured to indicate to the user information about the sound outlet being covered. For example the arrangement of protrusions could indicate whether the cover is a left channel speaker cover or a right channel speaker channel cover by the sound aperture arrangement forming a 'I' or 'R' shape. It would be understood that the magnetic flux behaves under the theory of electromagnetism.

Although the example embodiments describe the use of μ-metal to generate the concentrated magnetic field region, it would be understood that any other material with similar electromagnetic properties could be used as a substitute material. For example in some embodiments the material used can be any suitable material with high permeability (in other words low magnetic resistance). Examples of such other materials are stainless steel SUS 310 and SUS 430. The μ-metal can, as described herein, have in some embodiments openings shaped for dust (metal) collection without providing a sound transmission through the cover 190, in other words a sound inlet or sound outlet. In some embodiments, the apertures can substantially or partially provide sound transmission.

The concentrated magnetic field areas can be generated using the principle that the magnetic flux density is locally higher in a region where there is a narrow gap and/or a sharp edge/corner in the cover 190 or between the first layer 210 and the second layer 220. Furthermore in some embodiments by shaping these sound apertures suitably and forming an air gap between the first and second layers such that the sound output through the cover 190 provide a "dust trap" substantially on the exterior surface of the cover 190 in FIG. 3a and has only a small effect on the acoustic properties of the speaker module. Therefore in such embodiments, dust entering from the outside is attracted to the dust trap acoustically works without compromising the acoustic performance of the speaker module. In some embodiments, the cover 190 is provided such that the acoustic output of the speaker module is tuned providing a desired frequency response and acoustic output.

Figure 4A:
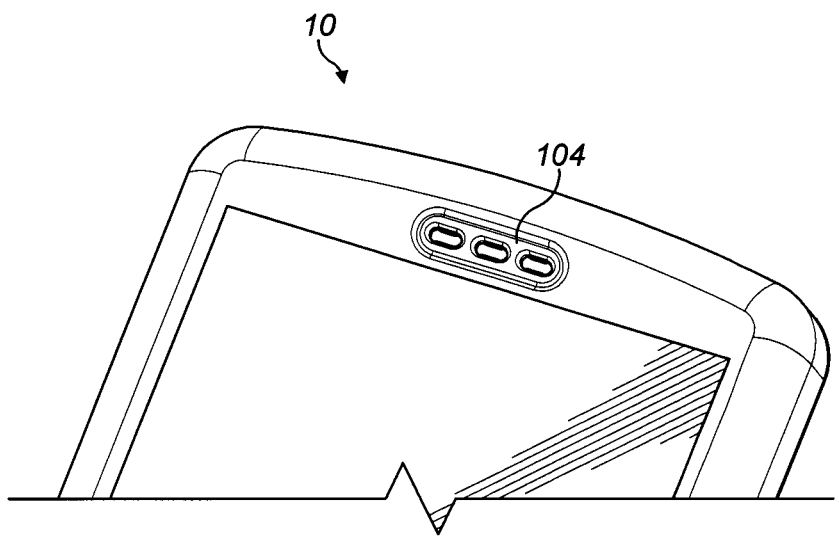
FIGS. 4a to 4c illustrate further schematic diagrams of a magnetic shield configuration according to some other embodiments of the application.
Figure 4B:
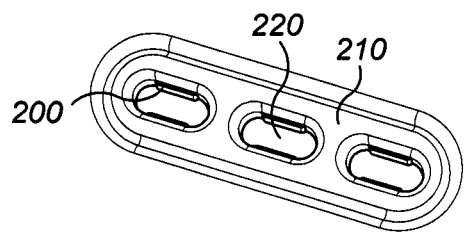
Figure 4C:
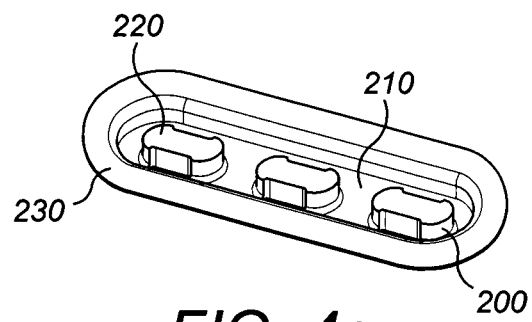

Although the example shown in FIG. 2 and FIGS. 3a and 3b described herein show dust trap or magnetic trap means located over the sound outlet 114, it would be understood that in some embodiments more than one magnetic trap can be implemented on the apparatus and/or implemented as a dust trap or magnetic trap means over a sound inlet. For example with respect to FIG. 4a a speaker/earpiece aperture 104 is shown over which a speaker/earpiece aperture cover of μ-metal is illustrated. The features in common use the same numerals of FIGS. 3a and 3b in FIGS. 4a to 4c.

Furthermore in some embodiments the μ-metal with associated air gap to form the dust trap and sound apertures to permit acoustic wave transmission can be configured to form a magnetic layer substantially above the first layer of the cover 190 in FIG. 3a. Furthermore although the air gap between the first layer 210 and the second layer 220 forming the dust trap/magnetic trap is shown as being uniform and symmetrical it would be appreciated that in some embodiments the air gap structure can be any suitable configuration such as non-uniform, non-symmetrical, a linear array, a rectangle, an oval, a circle, a semi circle.

In some embodiments the sound outlet 114 cover made of μ-metal comprises sound apertures or at least one sound aperture or conduit means through which the transmission of acoustic or sound waves can pass relatively unhindered. In some embodiments the μ-metal sound apertures are tuned or adjusted significantly to ensure that the audio performance of the mobile phone 10 is consistent even if the dust trap gets completely blocked by metal dust. In some embodiments some sound apertures closer to the middle of the sound outlet 114 or edge of the sound outlet 114 may comprise a stronger (or in some embodiments reduced) magnetic permeability or in some embodiments the cover comprises parts or sections without μ-metal configured in such a way that enough acoustic transparency is provided for the transmission of acoustic or sound waves can pass. Although in these examples the sound apertures are described as being acoustic holes, it would be understood that any suitable configuration or number of shapes can be implemented provided they provide a suitable acoustic medium.

Furthermore the mobile phone 10 can in some embodiments comprise means for producing a magnetically shielded region for example a separate magnet or at least one magnet plate or layer as part of the sound outlet 114 structure. In some embodiments the magnet layer can be locally integrated inside the cover 190. The magnet layer can be spaced from the cover 190 for example by a moulding in the cover or a separate gasket. The magnet layer can be provided as being the dust net in some alternative embodiments. Furthermore the magnet layer can be configured to form part of an acoustic chamber between the cover 190 and the magnet layer. In some embodiments the magnet layer can be a very thin but strong permanent magnet with a low magnetic permeability. In some embodiments the magnet layer can be a neodymium NdFeB magnet also known as NiB or Neo magnet. In some other embodiments the magnet layer can be any other suitable NdFeB, rare earth magnet. The location of the neodymium magnet can be used to counter the static magnetic field of the transducer or speaker. For this reason the neodymium magnet is typically in embodiments configured to be magnetised in the opposite direction compared to the transducer or speaker module magnet. In some embodiments the magnet layer can comprise sound apertures which permit the transmission of acoustic waves through the magnet layer. The magnet layer sound aperture or magnetic layer acoustic window can be any suitable shape, number, and arrangement and can in some embodiments be chosen to further tune the frequency response of the speaker module. In some embodiments the magnet layer sound apertures are configured to be located approximately centrally with respect to the speaker such that the static magnetic field generated by the fixed or state component of the speaker module is further minimised. In some embodiments the magnet layer sound apertures can be coated for example by a thin layer of tape or any material whose relative permeability is very low to further reduce the possibility of dust being attracted due to the air flowing to and from the speaker module. In a similar way, the at least one sound aperture of the cover 190 substantially or partially can be coated by any material whose relative permeability is low to reduce the possibility of dust being attracted due to the air flowing to and from the speaker module. In some embodiments, the rear surface of the cover in FIG. 3b can be coated by any material whose relative permeability is low to reduce the possibility of dust being attracted due to the air flowing to and from the speaker module.

In some embodiments, the mobile phone 10 can comprise a transducer or speaker module that is integrated with the sound outlet 114. The speaker module or transducer can be any suitable transducer such a moving coil, moving magnet, or any transducer or speaker generating a magnetic field. For example in a moving coil transducer there is typically a static magnetic field generated by a permanent magnet mounted and generating a magnetic field. The static magnetic field is changed in response to a dynamic transducer element when a current is passed through a coil. The static magnetic field is substantially shielded by the cover 190 and in some embodiments the additional or integrated neodymium magnet or magnet layer inside the cover 190 can be used. The reduction of/blocking of the static magnetic field reduces the possibility of magnetic material passing to the speaker as the magnet trap formed from the μ-metal is more attractive for to dust particles.

Figure 6:
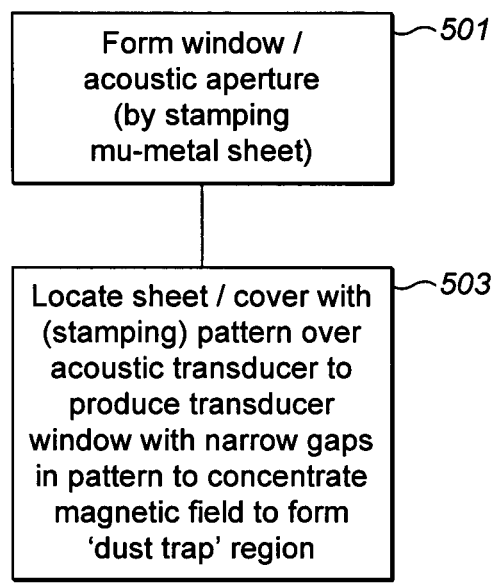
FIG. 6 illustrates a flow diagram showing the operation of the sound outlet according to some embodiments of the application.

With respect to FIG. 6 an operation of forming/using the magnetic/dust trap is shown.

In some embodiments the first operation is to design and/or manufacture the sound outlet 114 made of μ-metal comprising at least one sound aperture with a narrow gap. In some embodiments the gap can be formed by the close proximity of separate plates or the gap can be formed from cutting and/or, pressing and/or stamping material from a single plate to form a suitable air gap.

The operation of forming the window/acoustic aperture with magnetic/dust trapping means is shown in FIG. 6 by step 501.

The cover with window/acoustic aperture with magnetic/dust trapping means can then be located over the acoustic outlet (with respect to the speaker/earpiece) or acoustic inlet (with respect to the microphone) and between the transducer and exterior of the device. The location of the air gaps can furthermore be configured to be placed in an area of relatively high magnetic field strengths to form a magnetically attractive gap for the dust and other particles.

The operation of locating the window/acoustic aperture is shown in FIG. 6 by step 503.

It would be appreciated that in some embodiments the two operational steps with respect to the manufacturing operations can be carried out concurrently, where for example the process for forming the air gaps for the magnetic/dust trap is the main process.

It shall be appreciated that the term portable device is user equipment. The user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the various embodiments may be implemented in hardware or special purpose circuits, software, logic or any combination thereof. Some aspects of the application may be implemented in hardware, while other aspects may be implemented in firmware or software which may be executed by a controller, microprocessor or other computing device, although the application is not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application may be implemented by computer software executable by a data processor of the mobile device, such as in the processor entity, or by hardware, or by a combination of software and hardware.

For example, in some embodiments the method of manufacturing the apparatus may be implemented with processor executing a computer program.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the applications may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
  (a) hardware-only circuit implementations (such as implementations in only analog and/or digital circuitry) and
  (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
  (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this application. However, various modifications and adaptations may become apparent to those skilled in the relevant arts in view of the foregoing description, when read in conjunction with the accompanying drawings and the appended claims. However, all such and similar modifications of the teachings of this application will still fall within the scope of this application as defined in the appended claims. Indeed there is a further embodiment comprising a combination of one or more of any of the other embodiments previously discussed.

The invention claimed is:

1. An apparatus comprising:
an air displacement component configured to generate sound;
a cover comprising a first layer and a second layer, wherein an end portion of the second layer is integral with the first layer, wherein another portion of the second layer is extended away from the first layer so as to form at least one sound aperture between the first layer and the second layer, wherein the first layer is formed from a first material, wherein the second layer is formed from the same first material, wherein the second layer is secured to the first layer without being secured elsewhere, wherein the at least one sound aperture is configured to be acoustically coupled to the air displacement component and permits sound to pass between the first layer and the second layer when the sound is generated at the air displacement component, and wherein at least one of the first layer or the second layer is configured to produce a magnetically shielded region to form a trap for particles.

2. The apparatus as claimed in claim 1, wherein the at least one sound aperture is located between the air displacement component and an apparatus casing.

3. The apparatus as claimed in claim 1, wherein the magnetically shielded region is formed to trap particles on an exterior surface of the apparatus.

4. The apparatus as claimed in claim 1, further comprising a dust net located proximate to the at least one sound aperture configured to permit sound to pass through the dust net.

5. The apparatus as claimed in claim 1, wherein a region at the at least one sound aperture that is formed between the first and second layer, the region comprises at least one of:
a slit;
a pocket;
a aperture;
a conduit; or
a hole.

6. The apparatus as claimed in claim 1, further comprising an apparatus casing and wherein the cover is physically coupled to the apparatus casing and configured to permit sound to pass through the cover.

7. The apparatus as claimed in claim 1, wherein the magnetically shielded region comprises at least one of:
a mu-metal;
a material with high magnetic permeability;
stainless steel grade SUS 310; or
stainless steel grade SUS 430.

8. The apparatus as claimed in claim 1, wherein at least one surface of the at least one sound aperture is coated with a material whose permeability is at least higher or lower than the neighbouring region.

9. The apparatus as claimed in claim 1, wherein a permeability of the at least one sound aperture is lower than a region neighbouring the at least one sound aperture.

10. The apparatus as claimed in claim 1, wherein the magnetically shielded region comprises a magnetic field wherein the magnetic flux density is locally higher in a region which is formed with at least one of a narrow gap or a sharp edge between the first layer and the second layer.

11. The apparatus as claimed in claim 1, wherein the apparatus is configured as an acoustic radiator and radiates an acoustic signal from the air displacement component towards an exterior wherein said air displacement component converts electrical signal to the acoustic signal and is at least one of:
a moving coil speaker;
an electrostatic (or electret) speaker;
a piezo electric speaker;
a ceramic speaker; or
any other suitably designed speaker.

12. The apparatus as claimed in claim 1, wherein the first layer comprises at least one window which overlies and is offset from the second layer, wherein the at least one sound aperture is formed at a first layer window and an offset between the first and second layers.

13. The apparatus as claimed in claim 1, wherein the second layer is formed as protrusions in the first layer.

14. The apparatus as claimed in claim 13, wherein the protrusions comprise at least one of:
linear profile second layer; or
curved profile second layer.

15. The apparatus as claimed in claim 1, wherein the at least one sound aperture comprises at least two sound apertures, and wherein a first of the at least two sound apertures is configured to produce a magnetic field in a first direction and a second of the at least two sound apertures is configured to produce a magnetic field in a second direction.

16. The apparatus as claimed in claim 15, wherein at least one of orientation or shape of the at least two sound apertures is configured in such a way that a magnetic flux direction of the first sound aperture is substantially perpendicular to the direction of the magnetic flux of the second sound aperture.

17. The apparatus as claimed in claim 1, wherein the at least one sound aperture comprises at least two sound apertures and wherein a first of the at least two sound apertures is acoustically coupled to the air displacement component and a second of the at least two sound apertures is configured to produce a magnetic field.

18. A method comprising:
acoustically coupling an air displacement component within an apparatus to at least one sound aperture;
providing a cover comprising a first layer and a second layer, wherein an end portion of the second layer is integral with the first layer, wherein another portion of the second layer is extended away from the first layer for locating the at least one sound aperture between the first layer and the second layer, wherein the first layer is formed from a first material, wherein the second layer is formed from the same first material, and wherein the second layer is secured to the first layer without being secured elsewhere;
permitting and passing sound between the first layer and the second layer for coupling the air displacement component to the at least one sound aperture when the sound is generated at the air displacement component, and producing a magnetically shielded region for magnetically trapping particles with the formation of the first layer and the second layer.

19. The method as claimed in claim 18, further comprising forming the second layer as protrusions from the first layer, wherein forming the second layer as protrusions in the first layer comprises at least one of:
punching the first layer with a punch;
stamping the first layer with a stamp; or
scoring the first layer and
cutting the first layer.

* * * * *